April 26, 1927.
P. B. REEVES
1,626,300
SPLICE BLOCK FOR V-SHAPED TRANSMISSION
Filed April 12, 1926
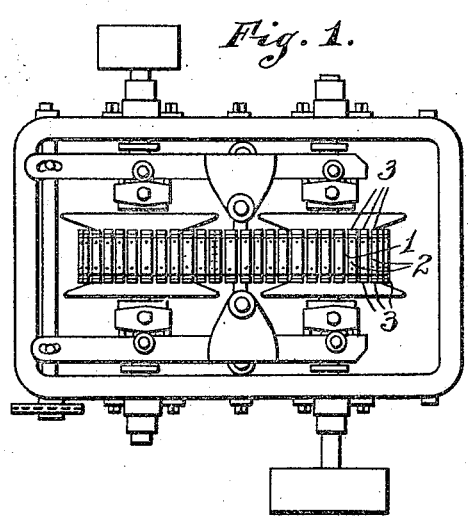
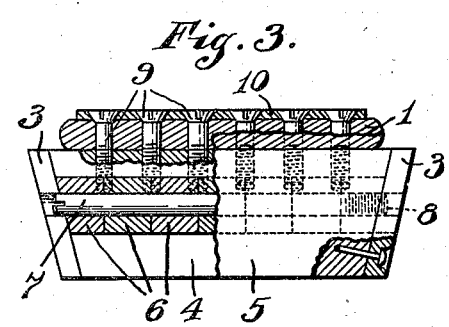
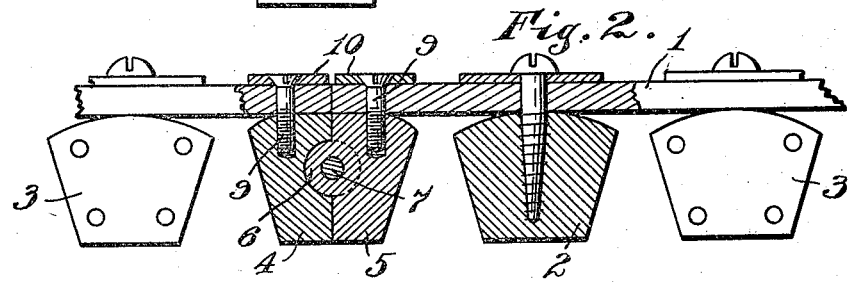
INVENTOR.
Paul B. Reeves,
BY
Hood + Hahn.
ATTORNEYS Patented Apr. 26, 1927.

1,626,300

UNITED STATES PATENT OFFICE.

PAUL B. REEVES, OF COLUMBUS, INDIANA, ASSIGNOR TO REEVES PULLEY COMPANY, OF COLUMBUS, INDIANA, A CORPORATION OF INDIANA.

SPLICE BLOCK FOR V-SHAPED TRANSMISSION.

Application filed April 12, 1926. Serial No. 101,291.

My invention relates to improvements in driving belts and particularly to that type of driving belt used in connection with the type of transmission which has for a long period been commercially known as the "Reeves" transmission. The driving belt for this type of transmission usually comprises a flexible continuous band on one face of which there is adapted to be secured a series of cross bars in the form of blocks the end faces of which are inclined inwardly to form a wedge shaped block and on these inclined faces is preferably secured a friction facing of leather or other suitable means. The blocks at their tops are generally curved and secured transversely to the band by suitable securing means.

It is the object of my present invention to provide an improved means for connecting the free ends of the band to form a continuous belt, this means being so constructed that the free ends may readily be connected and disconnected to permit of repair and adjustment.

For the purpose of disclosing my invention I have illustrated certain embodiments thereof in the accompanying drawings in which—

Fig. 1 is a plan view of the type of transmission to which my belt is particularly adapted for use;

Fig. 2 is a side elevation partly in section of a portion of the transmission belt showing particularly the connection for the two ends of the belt;

Fig. 3 is a transverse section showing the block at the two connected ends of the belt partly in section and partly in elevation.

In the structures illustrated the belt comprises a flexible band 1 usually formed of fabric, to which at regular intervals are secured the wedge shaped cross bars 2. These bars at their ends being inclined downwardly and inwardly and provided with leather friction faces 3 secured in position by any suitable means, as counter-sunk screws. The cross bars, and particularly the cross bar at the junction of the two ends of the belt, may readily be formed of aluminum or like material. At the connection point for the ends of the belt the cross bar is formed of two sections 4 and 5 which when assembled form a complete cross bar corresponding in shape and dimensions to the remaining cross bars. The adjacent faces of the sections 4 and 5 are each provided with interdigitated lugs or ears 6 nesting in corresponding counter-sunk sockets in the face of the opposite section so that when the sections 4 and 5 are placed together the adjacent faces will fit snugly. The ears or lugs 6 are provided with transversely extending openings to receive a locking pin 7 adapted to extend therethrough and preferably threaded at one end 8 to take into an internally threaded ear. The adjacent ends of the belt 1 are each secured on the top of one of the sections by means of securing screws 9 which pass through clamping plates 10 on the top of the end of the belt through the belt and into the section.

I claim as my invention:

1. A driving belt comprising a flexible band and a series of transversely extending friction blocks secured on one face thereof one of said blocks comprising two sections each secured to the free end of the band and having on the adjacent abutting faces thereof interdigitated fingers and means passing through said fingers for locking the sections together.

2. A driving belt comprising a flexible band and a series of transversely extending friction blocks secured on one face thereof one of said blocks being divided into two sections each secured to a free end of the band and each section having formed on the abutting face thereof a series of interdigitated fingers adapted to socket in corresponding sockets on the face of the opposite section and a pin passing through said interdigitating fingers for locking the two sections together.

In witness whereof, I PAUL B. REEVES have hereunto set my hand at Columbus, Indiana, this 8th day of April, A. D. one thousand nine hundred and twenty-six.

PAUL B. REEVES.